US007136681B2

(12) United States Patent
Sadler et al.

(10) Patent No.: US 7,136,681 B2
(45) Date of Patent: Nov. 14, 2006

(54) ELECTRICALLY CONDUCTIVE CARRIER AND PATTERNING FOR CONTROLLING CURRENT DISTRIBUTION IN A WIRELESS COMMUNICATIONS DEVICE

(75) Inventors: Robert A. Sadler, Raleigh, NC (US); Gerard James Hayes, Wake Forest, NC (US); William P. Stewart, Mebane, NC (US); Mark Douglas, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 631 days.

(21) Appl. No.: 09/999,212

(22) Filed: Oct. 31, 2001

(65) Prior Publication Data

US 2003/0083018 A1 May 1, 2003

(51) Int. Cl.
*H04B 1/38* (2006.01)

(52) U.S. Cl. .............................. 455/575.1; 455/556.1; 455/556.2; 455/575.3

(58) Field of Classification Search .. 455/575.1–575.9, 455/556.1, 556.2; 379/428.01, 429, 430
See application file for complete search history.

(56) References Cited

U.S. PATENT DOCUMENTS

| 4,037,047 | A | * | 7/1977 | Taylor | 174/254 |
| 4,952,528 | A | * | 8/1990 | Abe et al. | 438/638 |
| 5,010,449 | A | * | 4/1991 | Baldino | 361/792 |
| 5,572,223 | A | * | 11/1996 | Phillips et al. | 343/702 |
| 5,731,964 | A | * | 3/1998 | Kitakubo et al. | 361/816 |
| 5,748,455 | A | | 5/1998 | Phillips et al. | 361/818 |
| 5,787,361 | A | * | 7/1998 | Chen | 455/575.1 |
| 5,809,433 | A | * | 9/1998 | Thompson et al. | 455/575.7 |
| 5,819,163 | A | * | 10/1998 | Tsukamoto et al. | 455/575.1 |
| 5,867,772 | A | * | 2/1999 | Jonsson et al. | 455/575.1 |
| 5,903,822 | A | * | 5/1999 | Sekine et al. | 455/575.7 |
| 5,987,337 | A | * | 11/1999 | Takaya | 455/572 |
| 6,011,699 | A | * | 1/2000 | Murray et al. | 361/814 |
| 6,101,372 | A | * | 8/2000 | Kubo | 455/558 |
| 6,243,595 | B1 | * | 6/2001 | Lee et al. | 455/566 |
| 6,266,019 | B1 | * | 7/2001 | Stewart et al. | 343/702 |
| 6,359,787 | B1 | * | 3/2002 | Peltolehto et al. | 361/752 |
| 6,617,527 | B1 | * | 9/2003 | Ozeki et al. | 174/261 |
| 6,728,555 | B1 | * | 4/2004 | Pirila et al. | 455/566 |
| 6,754,507 | B1 | * | 6/2004 | Takagi | 455/550.1 |
| 6,771,992 | B1 | * | 8/2004 | Tomura et al. | 455/575.1 |
| 6,868,260 | B1 | * | 3/2005 | Jagielski et al. | 455/107 |
| 2001/0053673 | A1 | * | 12/2001 | Toyoda et al. | 455/90 |
| 2002/0094838 | A1 | * | 7/2002 | Wang | 455/550 |
| 2003/0066672 | A1 | * | 4/2003 | Watchko et al. | 174/50 |

FOREIGN PATENT DOCUMENTS

GB  EP 0727932 A2  8/1996

OTHER PUBLICATIONS

International Search Report for the corresponding International Application Number PCT/US02/32706 (mailed Feb. 10, 2003).
Currently pending U.S. Appl. No. 09/621,392, filed Jul. 21, 2000.
PCT Written Opinion, PCT/US02/32706, mailed May 23, 2005.

* cited by examiner

Primary Examiner—Matthew D. Anderson
Assistant Examiner—Tuan Pham

(57) ABSTRACT

A communications device includes a cover member, a circuit board having a lowest point of potential, and an antenna to transmit and receive RF signals. The antenna is electrically connected to the circuit board. A carrier is interposed between the circuit board and the cover member. The carrier includes an electrically conductive layer electrically connected to the point of lowest potential of the circuit board.

42 Claims, 13 Drawing Sheets

ELECTRICALLY CONDUCTIVE CARRIER AND PATTERNING FOR CONTROLLING CURRENT DISTRIBUTION IN A WIRELESS COMMUNICATIONS DEVICE

FIELD OF THE INVENTION

The present invention relates to electronic devices, and, more particularly, to means for controlling current distribution in a communications device.

BACKGROUND OF THE INVENTION

A wireless communications device such as a cellular telephone typically includes front and rear cover sections forming a housing about a circuit board. The circuit board includes the control circuitry for the cellular telephone and typically includes a ground plane. An antenna may be coupled through the circuit board for transmitting and receiving radio frequency (RF) signals. Metallization may be provided on the front cover section and/or on the rear cover section and electrically connected to the ground plane to improve antenna efficiency. When the handset is transmitting, RF currents from the antenna feed point may flow on the metallization layer and couple with other parts of the hand set and/or the user. The user's body may have several adverse effects on the RF performance of the wireless device, including lower antenna efficiency, antenna impedance mismatch, coupling of RF energy to other parts of the circuitry (e.g., noise affecting the audio path or "motor boating"), and bandwidth reduction. The electrical coupling of the metallization may be jeopardized by large mechanical or production variations, subsequently applied designer patterns, paints and lacquers.

SUMMARY OF THE INVENTION

According to embodiments of the present invention, a communications device includes a cover member, a circuit board having a lowest point of potential, and an antenna to transmit and receive RF signals. The antenna is electrically connected to the circuit board. A carrier is interposed between the circuit board and the cover member. The carrier includes an electrically conductive layer electrically connected to the point of lowest potential of the circuit board.

According to further embodiments of the present invention, a communications device includes a circuit board and an antenna to transmit and receive RF signals. The antenna is electrically connected to the circuit board. An electrically conductive layer overlies and is spaced apart from the circuit board. The electrically conductive layer is selectively patterned to control the distribution of RF currents on the communications device.

Objects of the present invention will be appreciated by those of ordinary skill in the art from a reading of the figures and the detailed description of the preferred embodiments which follow, such description being merely illustrative of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, "electrically connected" means that the referenced elements are directly or indirectly connected such that an electrical current may flow from one to the other. The connection may include a direct conductive connection (i.e., without an intervening capacitive, inductive or active element), an inductive connection, a capacitive connection, and/or any other suitable electrical connection. Intervening components may be present.

Wireless communications devices according to embodiments of the present invention include electrically conductive layers electrically connected to a circuit board and adapted to selectively control radio frequency (RF) currents on the wireless communications device. As described in greater detail below, the electrically conductive layer may be a layer disposed on a supporting substrate such as a cover member or a supplemental carrier substrate, or the electrically conductive layer may itself be a self-supporting member formed of a suitable electrically conductive material. The electrically conductive layer and its connection(s) to the circuit board may be selected and configured to reduce RF current peaks, to tune current distributions for selected RF bandwidths and to otherwise improve the performance of the wireless communications device. Additionally, carriers according to embodiments of the present invention may provide mechanical protection for the circuit board in addition to that provided by a housing cover member or members.

Figure 1:
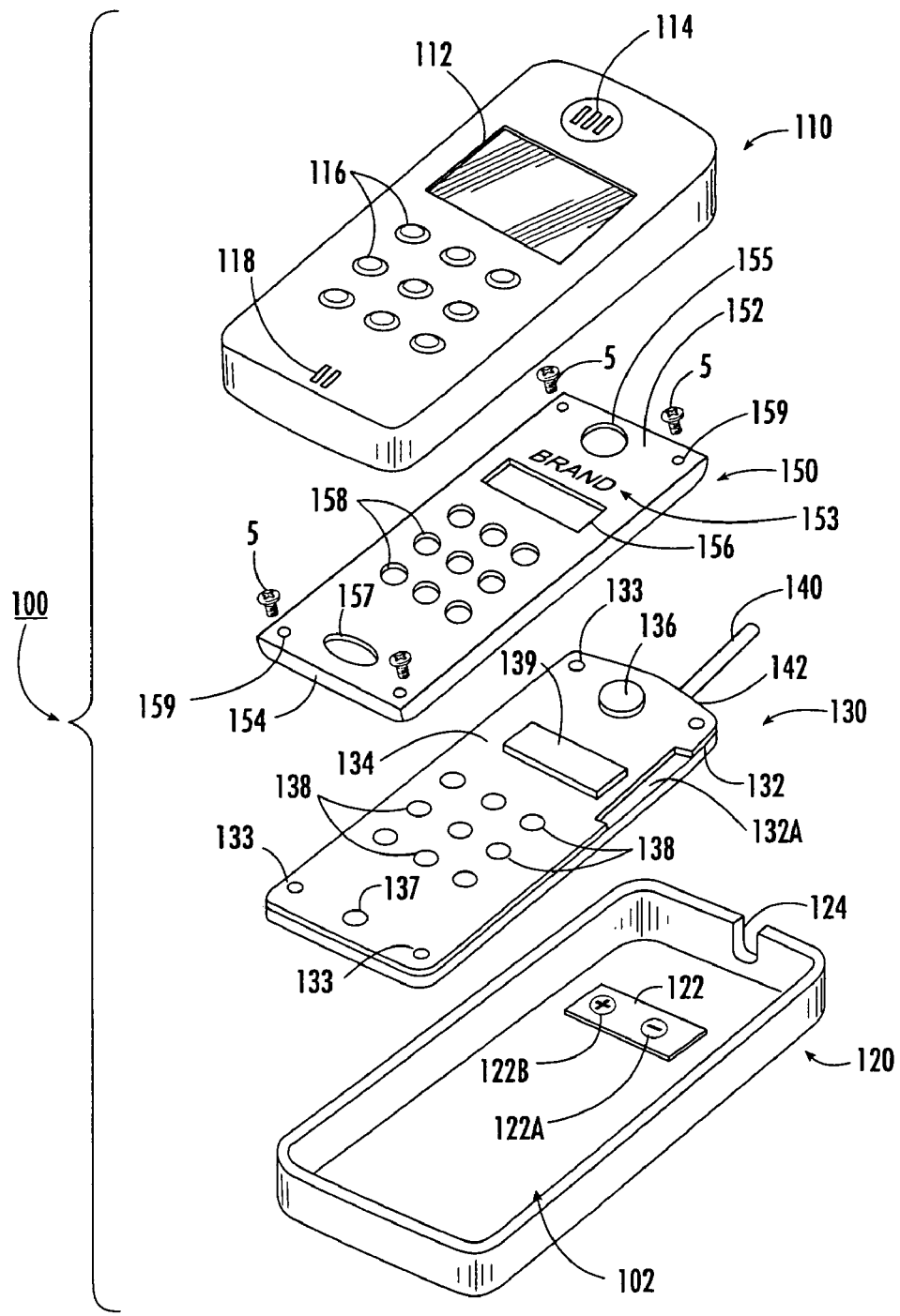
FIG. 1 is an exploded, perspective view of a wireless communications device according to embodiments of the present invention.
Figure 2:
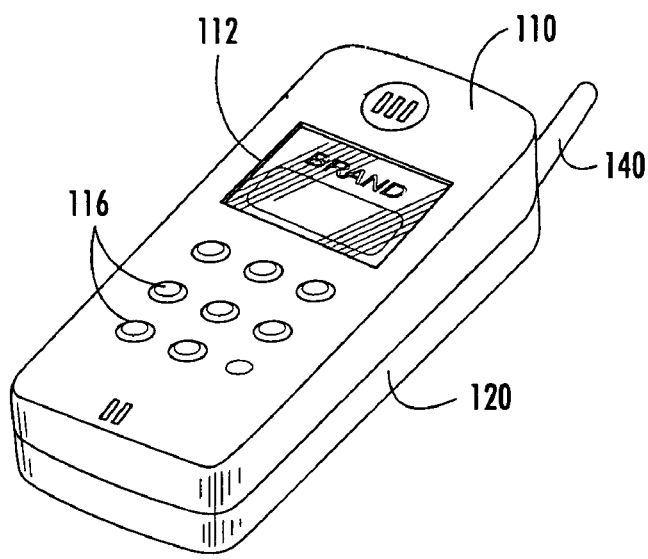
FIG. 2 is a front, perspective view of the wireless communications device of FIG. 1.

With reference to FIGS. 1 and 2, a wireless communications device 100 according to embodiments of the present invention is shown therein. The device 100 may be a cellular telephone, for example. The device 100 includes a front cover member 110 and a rear cover member 120 which together form a housing having a cavity 102. A circuit board (e.g., a printed circuit board (PCB)) 130 is disposed in the cavity 102. Additionally, a carrier 150 is disposed in the cavity 102 between the front cover member 110 and the circuit board 130. An antenna 140 is secured to the circuit board 130 and extends out of the rear cover member 120 through a slot 124. Alternatively, the antenna may be fully internal to the cover members 110, 120 or may be externally located and connected to the circuit board 130 by a suitable connector.

A battery or other suitable power source 122 having a positive terminal 122B and a negative terminal 122A is mounted on the rear cover member 120. A liquid crystal display (LCD) lens 112 and keypad buttons 116 are mounted in the front cover member 110. Speaker slots 114 and microphone slots 118 are formed in the front cover member 110. The cover members 110 and 120 may be formed of any suitable material. Preferably, the cover members 110 and 120 are formed of an electrically non-conductive material. More preferably, the cover members 110 and 120 are formed of a moldable polymeric material.

The circuit board 130 may be of conventional or other suitable construction except as discussed below. The circuit board 130 includes a ground plane 132 of electrically conductive metal. The ground plane 132 is electrically connected to the point of lowest potential (i.e., ground), typically the negative battery terminal 122A. The ground plane 132 is preferably substantially coextensive with the circuit board 130. Preferably, the ground plane 132 has an area of at least 3000 mm$^2$. The ground plane 132 is covered by an electrically insulative solder mask layer 134. The solder mask layer 134 is configured such that a frontwardly facing edge trace 132A of the ground plane 132 remains exposed. A liquid crystal display (LCD) 139, a speaker sound transducer 136, a microphone 137 and keypad switches (e.g., membrane switches) 138 are mounted on the front of the circuit board 130. The antenna 140 is electrically connected to the circuit board 130 at an antenna feed point 142. Threaded mount holes 133 are formed in the circuit board 130.

Figure 3:
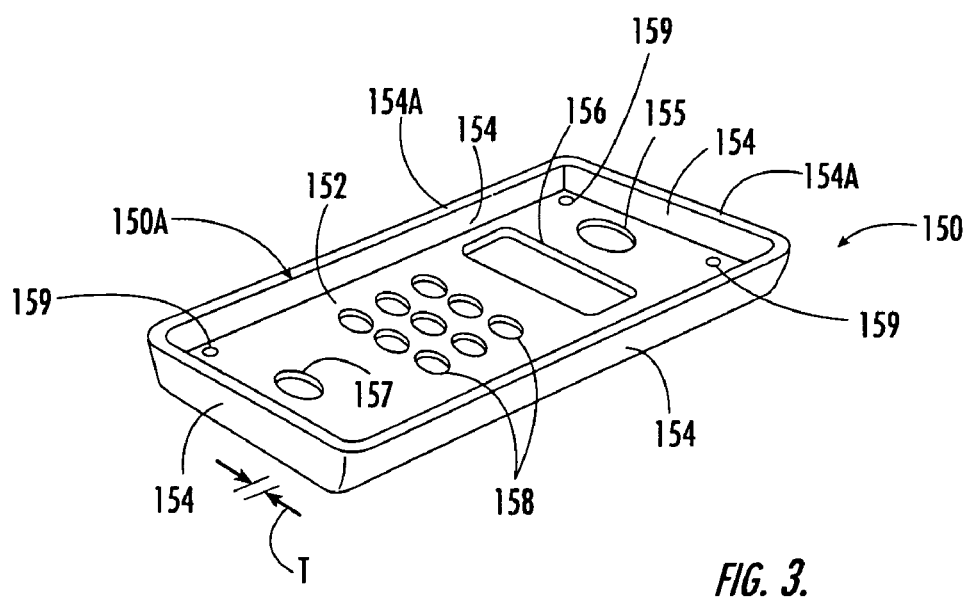
FIG. 3 is a rear perspective view of a carrier forming a part of the wireless communications device of FIG. 1.

As shown in FIGS. 1 and 3, the carrier 150 has a front wall 152 and a surrounding side wall 154 extending rearwardly from the front wall 152. The walls 152, 154 define a cavity 150A. The carrier 150 is secured to the circuit board 130 by screw fasteners 5 that extend through bosses 159 in the carrier 150 and engage the holes 133. An edge portion 154A of the side wall 154 engages the ground plane trace 132A. A display opening 156 in the carrier 150 allows the LCD 139 to be viewed through the lens 112. Keypad openings 158 in the carrier 150 allow the buttons 116 to engage and depress the switches 138. A speaker opening 155 is aligned with the speaker 136 and the slots 114. A microphone opening 157 is aligned with the microphone 137 and the slots 118. Optionally, suitable indicia 153 may be disposed on the front face of the carrier 150 and positioned so as to be viewable through the LCD lens 112.

The carrier 150 is integrally formed of an electrically conductive material. The selected material and configuration of the carrier 150 are chosen so that the carrier 150 is self-supporting and suitably durable for the intended use. By "self-supporting", it is meant that the carrier 150 will not significantly deform or collapse when subjected to normal intended use. In particular, the carrier will not significantly deform unless an external net load is placed thereon and, because the carrier 150 is substantially enclosed within the covers 110, 120, such an external load typically will not be experienced in use. Preferably, the selected material has a resistance of no more than 5 ohms across its surface. Suitable materials include stainless steel and beryllium copper. Preferably, the carrier 150 is formed of metal. Preferably, the carrier 150 has a substantially uniform thickness T (FIG. 3) of between about 0.5 mm and 1 mm. The outer surface area of the carrier 150 is preferably between about 2000 mm$^2$ and 5000 mm$^2$. The carrier 150 may be fabricated from multiple pieces (e.g., fastened, welded or bonded), but is preferably stamped, molded or otherwise formed from a continuous, unitary piece of stock material.

As will be understood from the foregoing description, the carrier 150 is directly electrically coupled to the ground plane 132 by the contact between the edge portion 154A and the ground plane trace 132A. The ground plane 132 is in turn electrically coupled to the negative battery terminal 122A so that the carrier 150 is electrically connected to the negative battery terminal 122A through the ground plane 132. More contact locations may be provided between the carrier 150 and the ground plane 132.

The electrical coupling between the carrier 150 and the circuit board 130 may be used to minimize current peaks and/or otherwise control the distribution of RF surface currents in the device 100. By spreading out current peaks, electrical coupling between a user and the wireless communications device 100 can be reduced, thereby reducing the negative effects of the user on the radiated performance of the device 100.

The surface current distribution may be modified and controlled by appropriately selecting the location or locations of the electrical connections between the carrier 150 and the negative battery terminal 122A. For example, a portion or portions of the carrier 150 may be directly, capacitively and/or inductively electrically coupled to multiple locations on the ground plane 132. Multiple locations on the carrier 150 may be separately electrically connected to the negative battery terminal 122A through the ground plane 132 or otherwise (e.g., directly, capacitively or inductively coupled to the negative battery terminal 122A without requiring current to pass through the ground plane 132). As discussed in more detail below, the surface current distribution may also be controlled by selectively patterning the electrically conductive layer of the carrier and/or capacitively or inductively coupling (through the ground plane or otherwise) the electrically conductive layer and the point of lowest potential.

Figure 4:
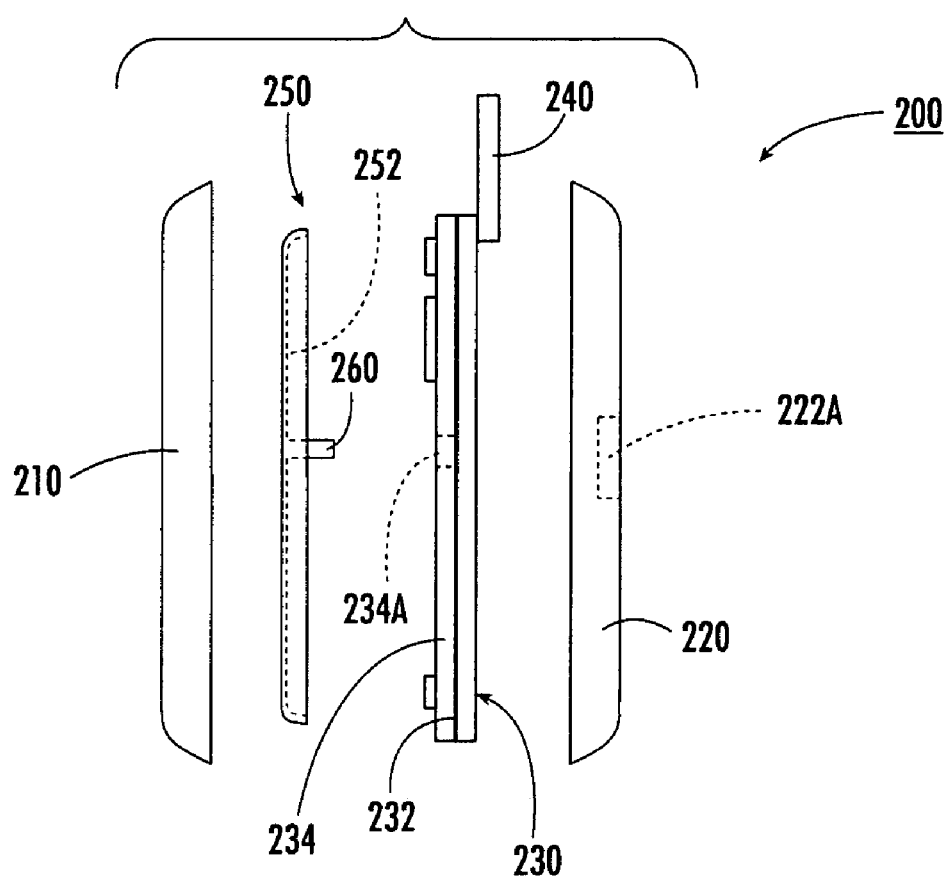
FIG. 4 is an exploded, side view of a wireless communications device in accordance with further embodiments of the present invention.

With reference to FIG. 4, a wireless communications device 200 according to further embodiments of the present invention is shown therein. The device 200 includes a front cover member 210, a rear cover member 220, a circuit board 230, an antenna 240 and a carrier 250 corresponding to elements 110, 120, 130, 140 and 150, respectively, except as follows. The circuit board 230 includes an opening 234A in the solder mask 234 thereof. The opening 234A frontwardly exposes a portion of the ground plane 232. The ground plane 232 is electrically connected to the negative battery terminal or other point of lowest potential 222A.

A projection or finger 260 of electrically conductive material is secured to the inner surface of the front wall 252 of the carrier 250 and extends rearwardly through the opening 234A and contacts the ground plane 232 at the selected location. In this manner, the finger 260 provides an electrical connection between the carrier 250 and the point of lowest potential 222A through the ground plane 232. The carrier 250 may be otherwise electrically isolated from the circuit board 230. Alternatively, more than one finger 260/opening 234A set may be provided and/or the finger 260 may be used in combination with any of the other connection techniques described herein. The finger 260 is preferably formed of an electrically conductive material as described above for the carrier 150 and may be integrally formed with the carrier 250.

Figure 5:
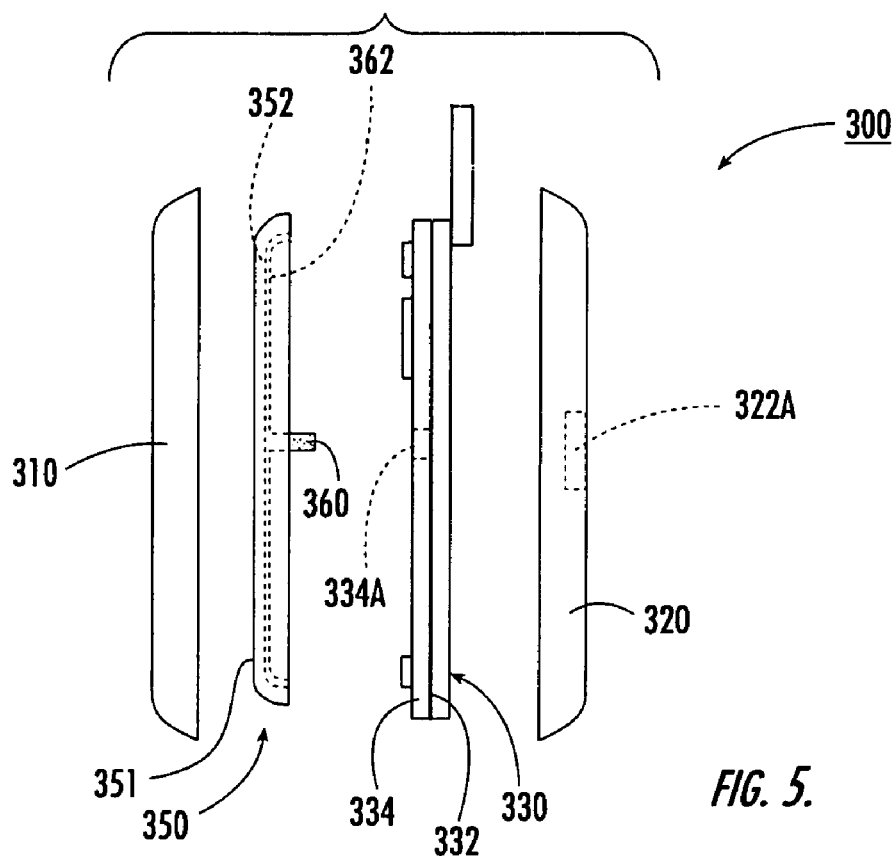
FIG. 5 is an exploded, side view of a wireless communications device in accordance with further embodiments of the present invention.
Figure 6:
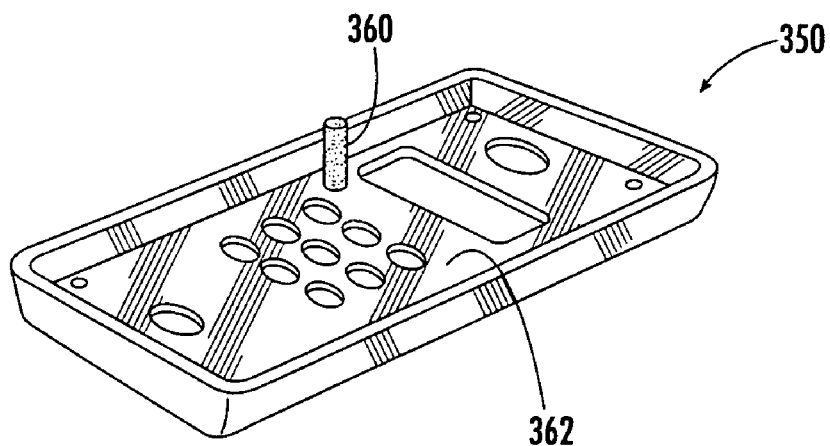
FIG. 6 is a rear perspective view of a carrier forming a part of the wireless communications device of FIG. 5.

With reference to FIGS. 5 and 6, a wireless communications device 300 according to further embodiments of the present invention is shown therein. The device 300 corresponds to the device 200 except as follows. The carrier 350 is a composite member including a carrier substrate 351 and an electrically conductive layer 362.

The carrier substrate 351 is formed of a selected material and in a configuration such that it is self-supporting and suitably durable for the intended use. The carrier substrate 351 is preferably formed of an electrically non-conductive material. Suitable materials for the carrier substrate 351 include moldable polymeric materials, and more preferably, polycarbonate or polycarbonate ABS.

The electrically conductive layer 362 is formed of a suitable electrically conductive material, for example, as described above for the carrier 150. Preferably, the selected electrically conductive material has a resistance of no more than 5 ohms across its surface. The electrically conductive layer 362 may be plated onto (e.g., by spraying, painting, vacuum depositing or electrostatically depositing), mechanically fastened, bonded or otherwise secured to the carrier substrate 351. The electrically conductive layer 362 may be substantially coextensive with or cover only selected portions of the surface area of the carrier substrate 351. The electrically conductive layer 362 may cover either the rear surface or the front surface of the carrier substrate 351. In some instances, it may be preferable for the electrically conductive layer 362 to cover the front surface of the carrier substrate 351 to reduce unintended electrical coupling between the electrically conductive layer 362 and the circuit board 330.

A projection 360 of electrically conductive elastomer (ECE) extends from the electrically conductive layer 362 and through the opening 334A in the solder mask 334 and contacts the exposed portion of the ground plane 332. In this manner, the projection 360 provides an electrical connection between the electrically conductive layer 362 and the point of lowest potential 322A through the ground plane 332. The electrically conductive layer 362 may be otherwise electrically isolated from the circuit board 330 or additional connections may be provided. The conductivity of the ECE of the projection 360 may be modified to restrict some energy from flowing onto the electrically conductive layer 362 if desired.

Figure 7:
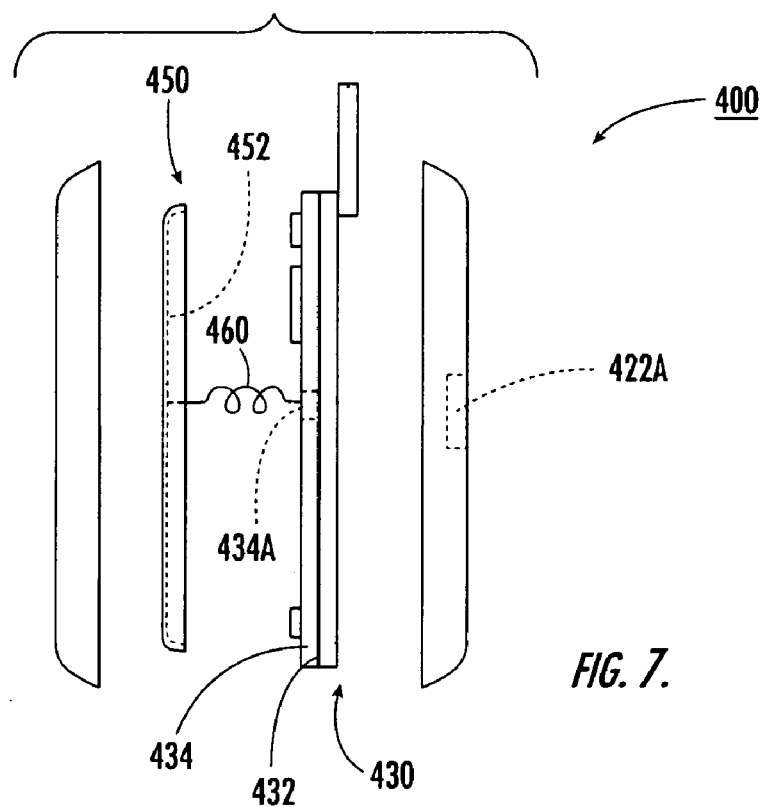
FIG. 7 is an exploded, side view of a wireless communications device in accordance with further embodiments of the present invention.

With reference to FIG. 7, a wireless communications device 400 according to further embodiments of the present invention is shown therein. The device 400 corresponds to the device 200 except as follows. In the device 400, the finger 260 is replaced with an inductor 460 that extends from the front wall 452 of the carrier 450 to the ground plane 432 through the opening 434A in the solder mask 434. The inductor 460 may be a helically wound coil of electrically conductive wire with an air core. The carrier 450 is thereby inductively coupled to the ground plane 432 and thereby electrically connected to the point of lowest potential 422A. Preferably, the carrier 450 is otherwise electrically isolated from the circuit board 430.

Figure 8:
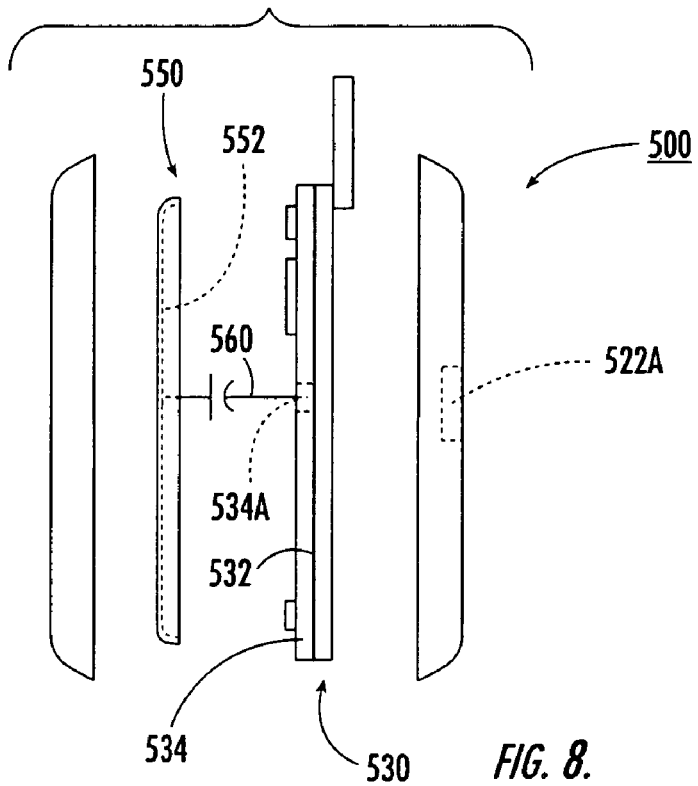
FIG. 8 is an exploded, side view of a wireless communications device in accordance with further embodiments of the present invention.

With reference to FIG. 8, a wireless communications device 500 according to further embodiments of the present invention is shown therein. The device 500 corresponds to the device 400 except that the inductor 460 is replaced with a capacitor 560. The capacitor 560 extends from the front wall 552 of the carrier 550 to the ground plane 532 through the opening 534A in the solder mask 534. The capacitor 560 may be a pair of metal contacts with a suitable dielectric material interposed therebetween. The carrier 550 is capacitively coupled to the ground plane 532 and thereby electrically connected to the point of lowest potential 522A.

Figure 9:
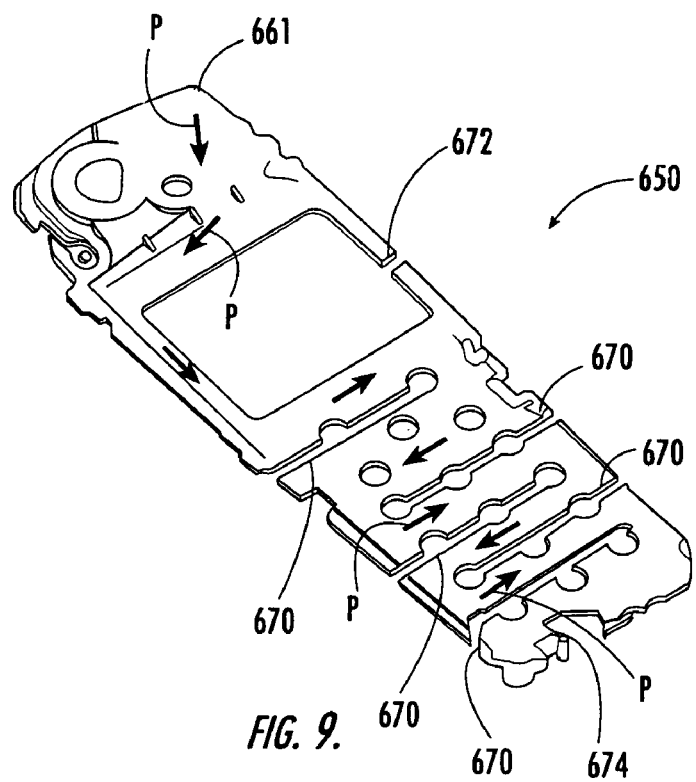
FIG. 9 is a front perspective view of a carrier according to further embodiments of the present invention.

With reference to FIG. 9, an electrically conductive carrier 650 according to further embodiments of the present invention is shown therein. The carrier 650 may be used in place of the carrier 150 in the device 100, for example. The carrier 650 differs from the carrier 150 in that a plurality of slots 670 and a cut out 672 are formed therein. The slots 670 and cut out 672 provide the carrier 650 with a selected pattern that spreads the RF currents in the carrier 650 to minimize surface current peaks.

Preferably, the carrier 650 is electrically coupled to the circuit board (which is connected to ground) at a location near a region 661 adjacent the antenna feed point so that the cut out 672 is on the same side of the wireless communications device as the antenna. In this manner, the slots 670 and the cut outs 672 provide an extended current path as indicated by the arrows P. The meandering path may be configured to generate frequency dependent inductance. A further cut out 674 is located adjacent the microphone (in the assembled wireless communications device) to reduce unintended coupling between the carrier 650 and the microphone which might otherwise allow RF currents to degrade the audio path.

Figure 10:
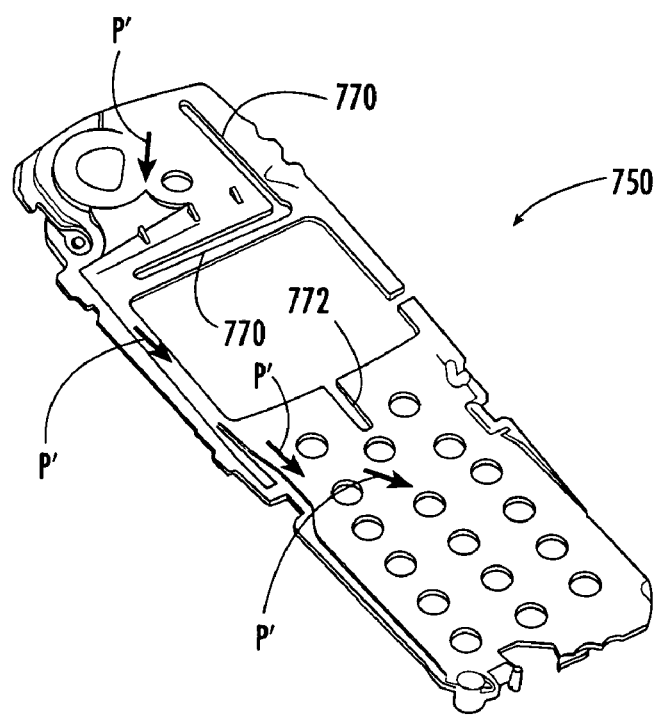
FIG. 10 is a front perspective view of a carrier according to further embodiments of the present invention.

With reference to FIG. 10, a carrier 750 according to further embodiments of the present invention is shown therein. The carrier 750 corresponds to the carrier 650 except that a different pattern of slots 770 along with a cut out 772 are formed in the carrier 750. The pattern provided thereby similarly serves to force surface currents to follow a desired path P'.

Figure 11:
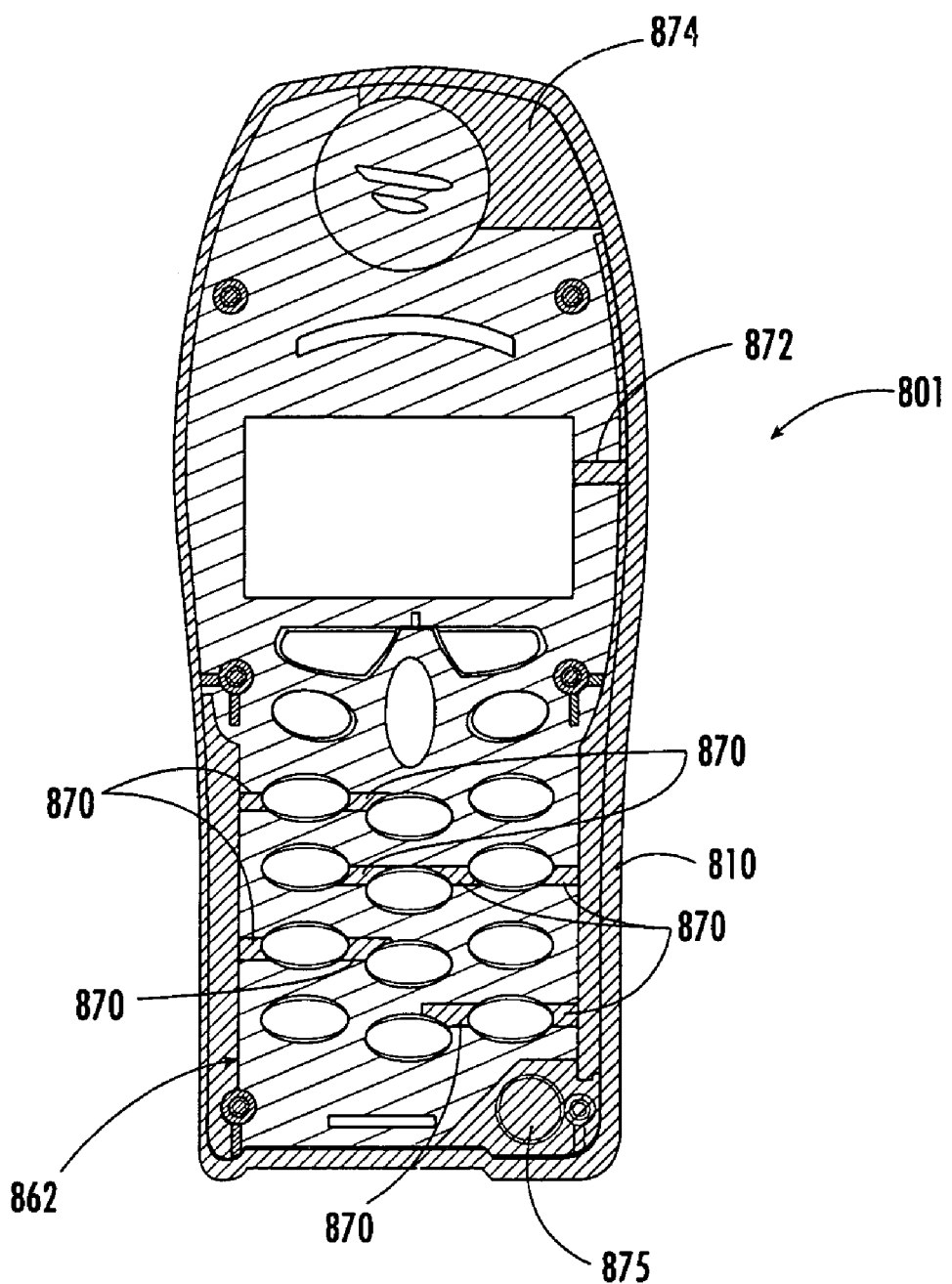
FIG. 11 is a front elevational view of a metallized front cover assembly according to further embodiments of the present invention.

With reference to FIG. 11, a front cover assembly 801 according to embodiments of the present invention is shown therein. The assembly 801 may be used in place of the front cover members and the carriers described above to form wireless communications devices according to the present invention.

The assembly 801 includes a front cover member 810 and an electrically conductive layer 862 secured to the inner surface of the front cover member 810 in any suitable manner (e.g., as described above with regard to the securement between the carrier substrate 351 and the electrically conductive layer 362). The front cover member 810 is formed of an electrically non-conductive material such as described above with regard to the front cover member 110. The electrically conductive layer 862 is formed of a material such as described above with regard to the electrically conductive layer 362.

The electrically conductive layer 862 has a pattern similar to that of the carrier 650. The electrically conductive layer 862 has slots 870 and a cut out 872 corresponding to the slots 670 and the cut out 672 to force the RF currents along a desired path similar to the current path provided by the carrier 650. In order to prevent undesired connections to the circuit board, the electrically conductive layer 862 does not cover the mounting bosses 817 and related structures of the front cover member 810. The electrically conductive layer 862 has a void 874 adjacent the location on the circuit board (when the associated wireless communications device is assembled) of the antenna feed point to provide improved control of current peak distribution. Also, the electrically conductive layer 862 has a void 875 adjacent the location of the microphone on the circuit board.

Figure 12:
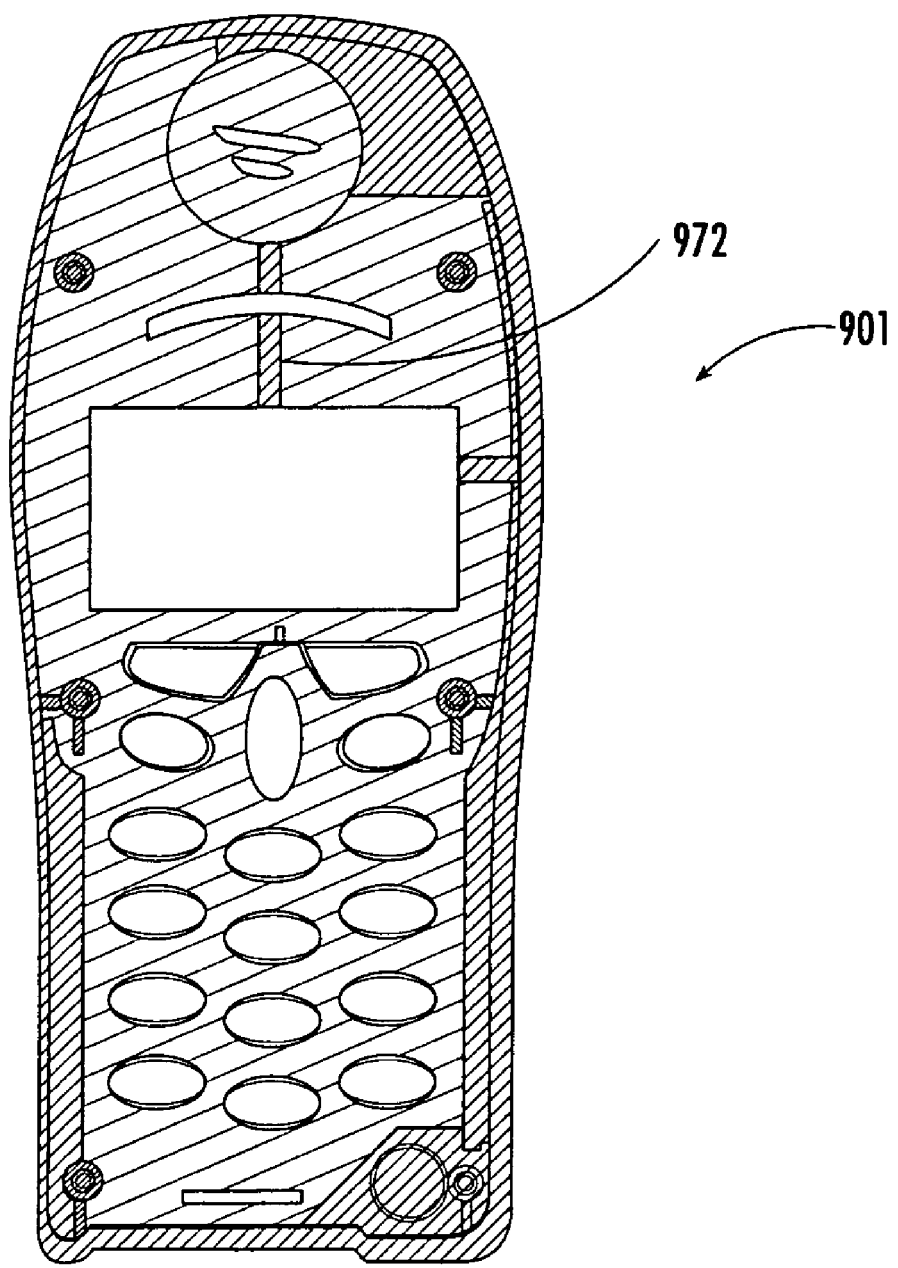
FIG. 12 is a front elevational view of a metallized front cover assembly according to further embodiments of the present invention.

With reference to FIG. 12, a front cover assembly 901 according to embodiments of the invention is shown therein. The front cover assembly 901 corresponds to the front cover assembly 801 except that the slots 870 are replaced with a slot 972 to provide a desired RF current distribution. According to further embodiments (not shown), the slot 972 may be omitted.

Figure 13:
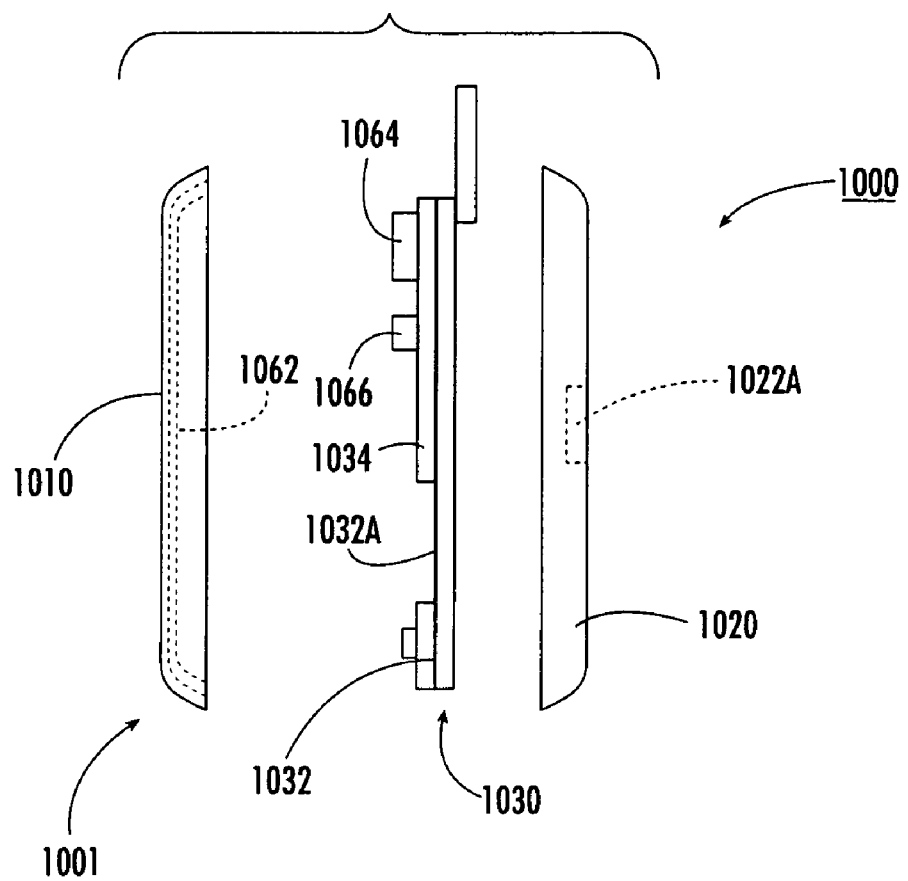
FIG. 13 is an exploded, side view of a wireless communications device according to further embodiments of the present invention.

A wireless communications device 1000 according to embodiments of the present invention is shown in FIG. 13. The device 1000 includes a rear cover member 1020 and a point of lowest potential 1022A corresponding to the rear cover member 120 and the point of lowest potential 122A, respectively. A circuit board 1030 is interposed between the rear cover member 1020 and a front cover assembly 1001 according to embodiments of the invention. The circuit board 1030 has electrically conductive shield cans 1064, 1066 mounted thereon. The shield cans 1064, 1066 are electrically connected to the ground plane 1032 and thereby to the point of lowest potential 1022A. A portion 1032A of the ground plane 1032 is exposed through the solder mask 1034.

Figure 14:
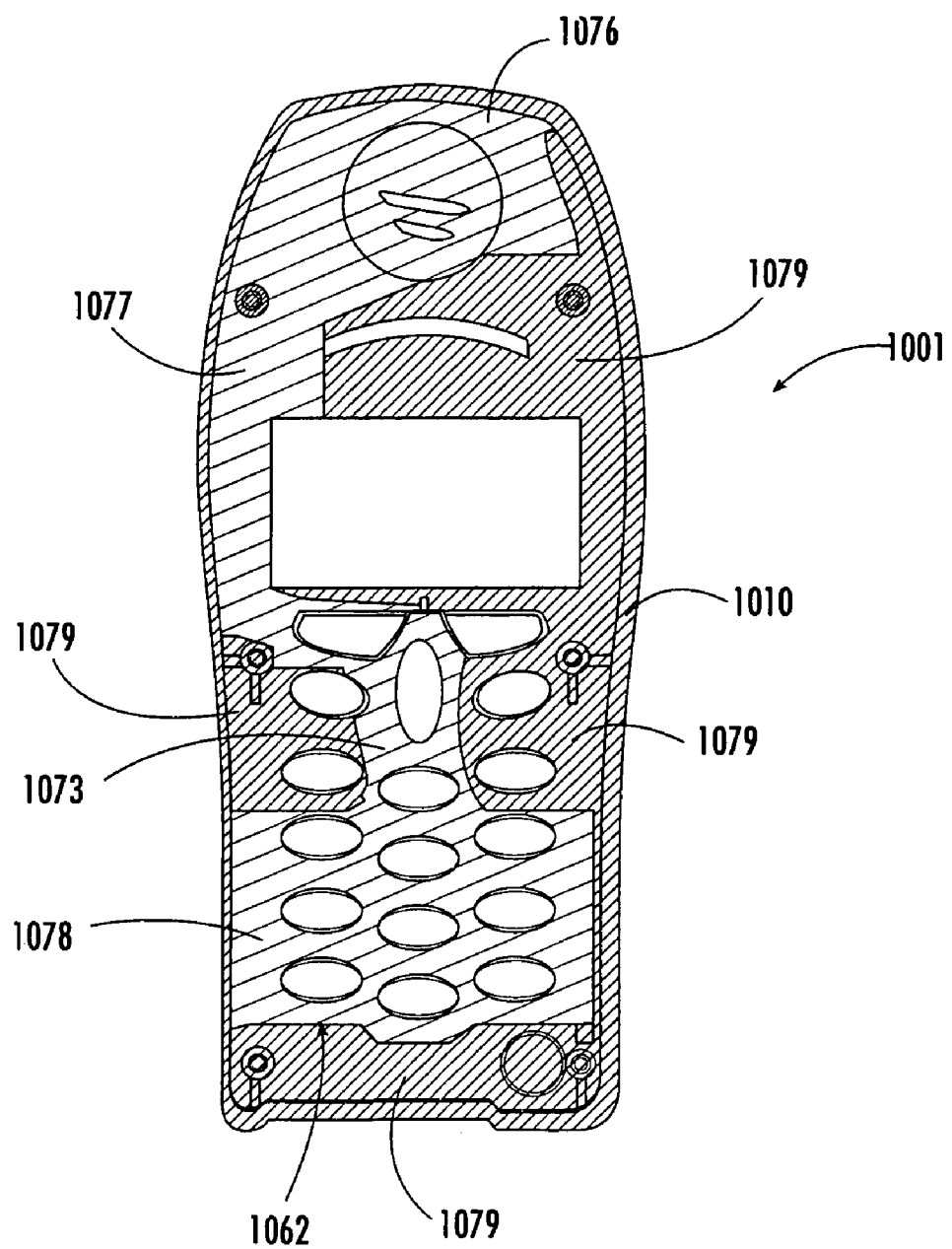
FIG. 14 is a front elevational view of a metallized front cover assembly according to further embodiments of the present invention and forming a part of the wireless communications device of FIG. 13.

With reference to FIG. 14, the front cover assembly 1001 includes a front cover member 1010 and an electrically conductive layer 1062 and corresponds to the assembly 801 except that the electrically conductive layer 1062 thereof is patterned differently. The electrically conductive layer 1062 includes portions 1076 and 1077 overlying the shield cans 1064 and 1066. The electrically conductive layer 1062 also includes a portion 1078 overlying a selected portion 1032A of the ground plane 1032. The distances between the portions 1076 and 1077 and the shield cans 1064 and 1066 and the distance between the portion 1078 and the ground plane portion 1032A may be selected (e.g., by appropriately shaping the inner contours of the front cover member 1010) to provide a desired amount of electrical coupling therebetween. For capacitive coupling, the portions 1076, 1077, 1078 are preferably positioned between about 0.1 mm and 5 mm from the adjacent surfaces of the shield cans 1064, 1066 or ground plane portion 1032A. Alternatively, the portions 1076, 1077, 1078 may directly contact or may be bridged to the shield cans 1064, 1066 and the ground plane portion 1032A using conductors or lumped elements. Voids 1079 are provided in the electrically conductive layer 1062 to reduce or prevent unintended coupling between the electrically conductive layer 1062 and the circuit board. The electrically conductive layer 1062 also has a current choke portion 1073.

Figure 15:
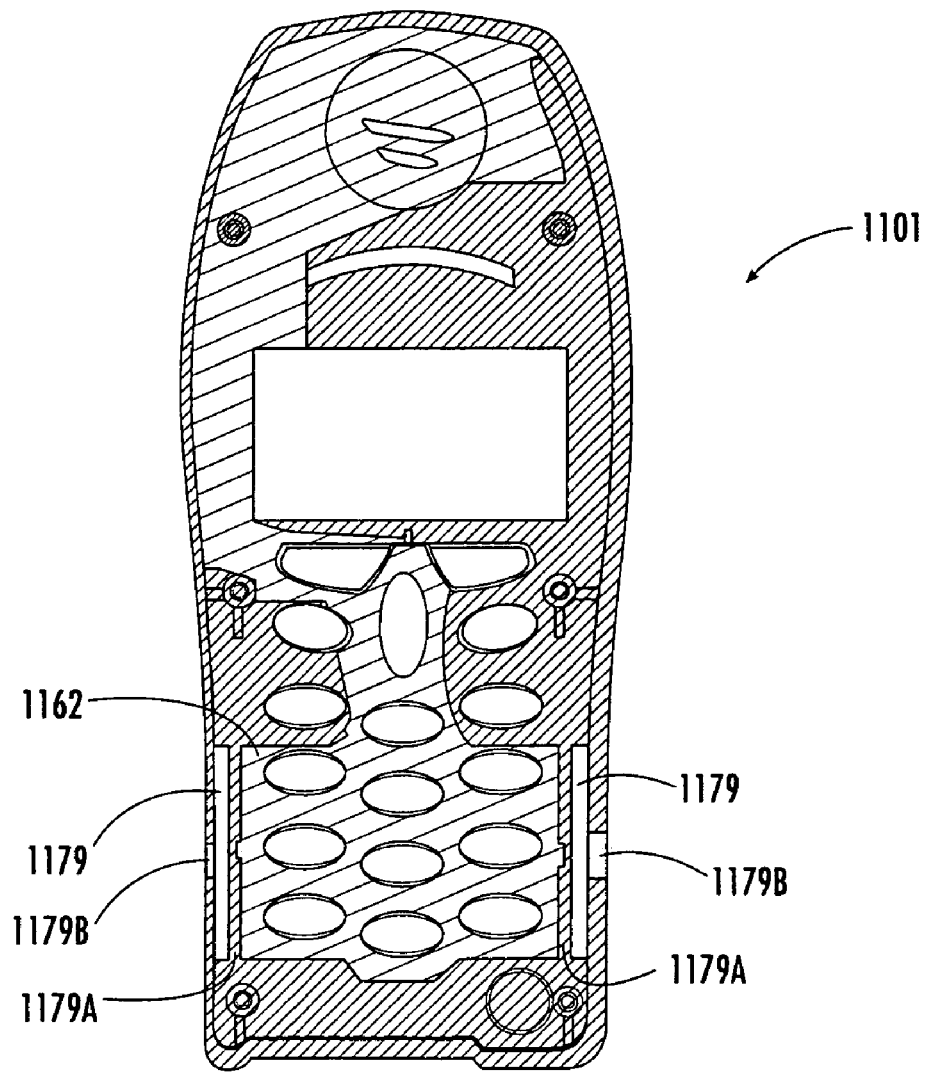
FIG. 15 is a front elevational view of a metallized front cover assembly according to further embodiments of the present invention.

With reference to FIG. 15, a front cover assembly 1101 according to further embodiments of the invention is shown therein. The assembly 1101 includes an electrically conductive layer 1162. The assembly 1101 otherwise corresponds to the assembly 1001 except that it further includes parasitic strips 1179. The strips 1179 may be formed of the same electrically conductive material as discussed above with regard to the carrier 150. The strips 1179 are separated from the layer 1162 by gaps 1179A so that the strips 1179 are capacitively coupled to the layer 1162. The lengths of the strips 1179 may be selected to tune the capacitance.

The strips 1179 may be directly electrically connected to the ground plane (e.g., by means of tabs 1179B) or may be capacitively coupled to the ground plane. If the strips 1179 are only capacitively coupled to the ground plane, they preferably each have a length of ¼ or ½ of a selected wavelength.

Figure 16:
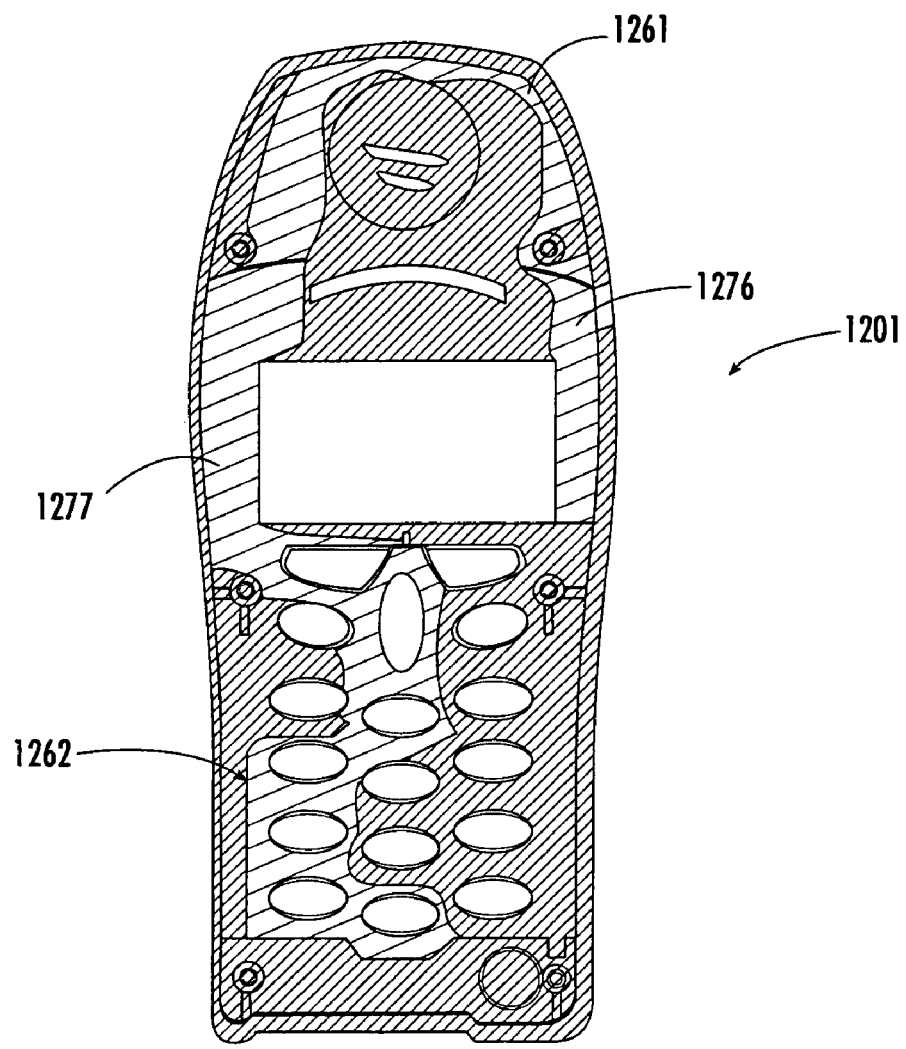
FIG. 16 is a front elevational view of a metallized front cover assembly according to further embodiments of the present invention.

With reference to FIG. 16, a front cover assembly 1201 according to further embodiments of the invention is shown therein. The assembly 1201 corresponds to the front cover assembly 801 except that the electrically conductive layer 1262 is differently patterned than the electrically conductive layer 862. The electrically conductive layer 1262 is connected to the circuit board ground (not shown) at a location 1261 near the antenna feed point. The electrically conductive layer 1262 includes a first leg portion 1276 and a second, longer leg portion 1277 extending from the location 1261 in generally opposite directions.

The shorter leg portion 1276 may be tuned to serve as a resonant branch tuned to a selected high frequency band. The longer leg portion 1277 may be tuned to serve as a resonant branch tuned to a selected low frequency band. Preferably, each of the leg portions 1276, 1277 has a length that is ¼ or ½ the selected wavelength. In this manner, the antenna system (including the electrically conductive layer 1262) may be matched to each frequency band.

Figure 17:
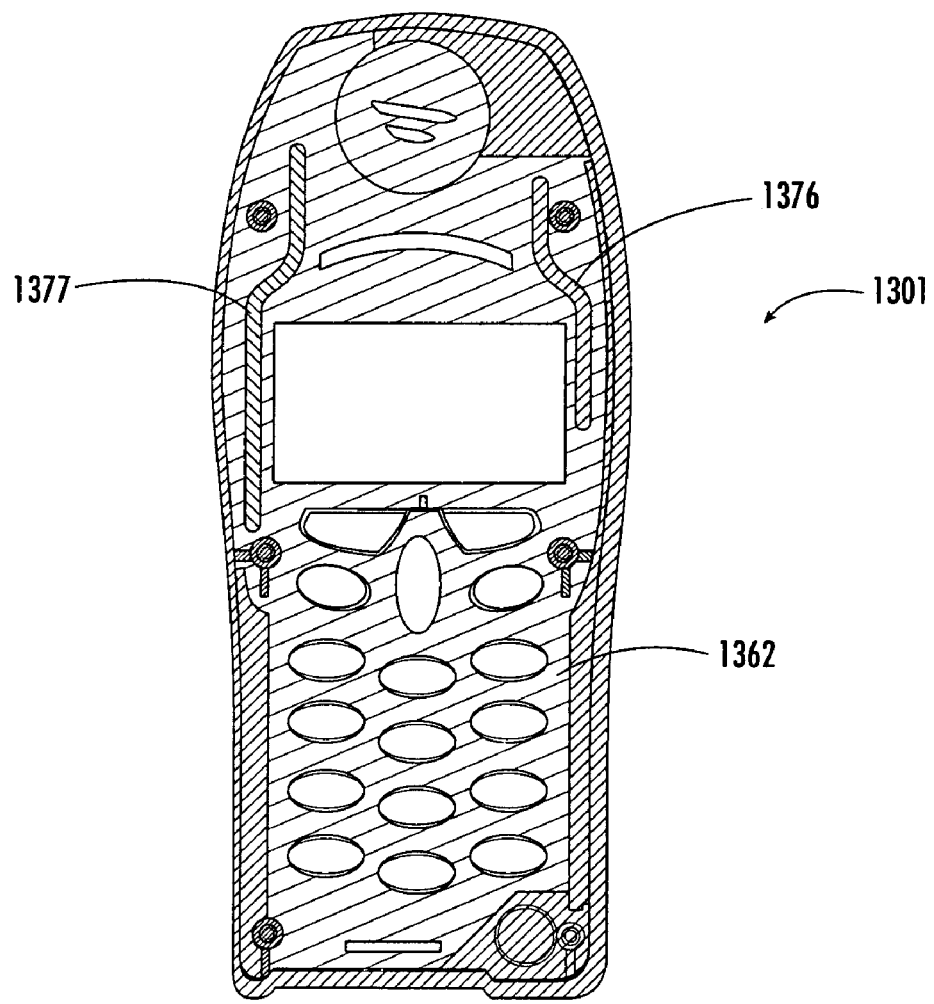
FIG. 17 is a front elevational view of a metallized front cover assembly according to further embodiments of the present invention.

With reference to FIG. 17, a front cover assembly 1301 according to further embodiments of the invention is shown therein. The assembly 1301 corresponds to the assembly 1201 except that the electrically conductive layer 1362 thereof is differently patterned. The electrically conductive layer 1362 includes a first slot 1376 and a second, longer slot 1377. The slots 1376 and 1377 may be tuned to serve as high and low frequency resonant branches in the same manner as discussed above with regard to the leg portions 1276 and 1277. Preferably, each of the slots 1276, 1277 has a length that is ¼ or ½ the selected wavelength.

Using the various electrical coupling techniques, patterns and/or features described above, the overall antenna efficiency may be improved and RF coupling between the user and the device may be reduced. The RF currents flowing at selected frequency bands may be improved or optimized to reduce RF noise that may degrade receiver and audio circuitry. Moreover, the RF currents flowing at selected frequency bands may be optimized to lower the Q, and thereby increase the bandwidth, of the antenna system. For example, using the capacitive coupling techniques and/or the inductance added by the meandering current flow path in certain of the above-described electrically conductive layers, the designer may optimize the RF currents flowing at specific frequency bands.

While certain coupling techniques, configurations, features and the like have been described above with reference to certain embodiments, it will be appreciated from the description herein that many of these aspects may be substituted for one another or combined in different configurations and constructions. For example, each of front cover assemblies 801, 901, 1001, 1101, 1201, 1301 may be used as rear cover assemblies of a wireless communications device with suitable modifications to the cover members 810, 910, 1010, 1110, 1210, 1310. While the various carriers have been described as mounted in wireless communications devices between a front cover member and a circuit board, each of the carriers may be mounted between a rear cover member and the circuit board. With modifications as necessary, each of the front cover assemblies 801, 901, 1001, 1101, 1201, 1301 may also be used as composite carriers interposed between a circuit board and a front or rear cover member (e.g., similar to the carrier 350). Each of the electrically conductive layers 862, 962, 1062, 1162, 1262, 1362 may be used as an integral, self-supporting carrier (e.g., similar to carriers 650, 750) and interposed between a front or rear cover member and a circuit board of a wireless communications device. Such carriers may also employ the connection or coupling techniques discussed with regard to the carriers 150, 250, 350, 450, 550.

The electrically conductive layers (including the integral carriers) 150, 250, 362, 450, 550, 650, 750, 862, 962, 1062, 1161, 1262, 1362 preferably have a surface area of between about 250 mm$^2$ and 500 mm$^2$. Preferably, at least a portion of each of the electrically conductive layers is spaced apart from the adjacent circuit board a distance of between about 0.1 mm and 5 mm. The preferred area and spacing will depend on the overall design of the antenna system and the intended performance of the electrically conductive layer.

The carriers 150, 250, 350, 450, 550 are preferably separately formed from the adjacent cover member. Where a carrier separate from the front and rear cover members is provided (e.g., the carriers 150, 250, 350), the carrier is preferably spaced apart from the adjacent cover member. Preferably, the spacing between the carrier and the adjacent cover member is at least 0.1 mm, and more preferably, between about 0.5 mm and 2 mm.

In each of the aforedescribed wireless communications devices, the electrically conductive layer 150, 250, 362, 450, 550, 650, 750, 862, 962, 1062, 1161, 1262, 1362 may be electrically connected to the corresponding ground plane at multiple locations on the ground plane. The lowest point of potential may be connected to multiple locations on the respective electrically conductive layer.

The wireless communications devices described above employing patterned electrically conductive layers (e.g., layers 650, 750, 862, 962, 1062, 1161, 1262, 1362) may be modified in accordance with the present invention to eliminate the electrical connection(s) between the patterned electrically conductive layer and the point of lowest potential. In such case, the patterned electrically conductive layer is not directly, capacitively or inductively coupled to the point of lowest potential or the ground plane.

According to further embodiments, each of the foregoing wireless communications devices is modified such that the electrically conductive layer is electrically connected to the point of lowest potential without use of the ground plane as an intervening connecting element. The electrically conductive layer may be connected to the point of lowest potential without providing any intervening element. The ground plane may be omitted.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A communications device comprising:
   a) a cover member;
   b) a circuit board having a point of lowest potential;
   c) an antenna to transmit and receive RF signals, wherein said antenna is electrically connected to said circuit board; and
   d) a carrier interposed between said circuit board and said cover member, said carrier including an electrically conductive layer electrically connected to said point of lowest potential of said circuit board;
   e) wherein said electrically conductive layer has at least one of a slot and a cutout formed therein to selectively control the path of RF currents in said electrically conductive layer.

2. The communications device of claim 1 including:
   a component disposed between said circuit board and said carrier; and
   an opening formed in said carrier adjacent said component.

3. The communications device of claim 1 wherein said carrier is self-supporting.

4. The communications device of claim 1 wherein said carrier is separately formed from said cover member.

5. The communications device of claim 1 wherein at least a portion of said electrically conductive layer is spaced apart from said circuit board.

6. The communications device of claim 1 wherein said carrier is spaced apart from said cover member.

7. The communications device of claim 1 wherein said carrier is integrally formed of an electrically conductive material.

8. The communications device of claim 7 wherein said carrier is integrally formed of metal.

9. The communications device of claim 1 wherein said carrier includes a non-metallic substrate and said electrically conductive layer is secured to said substrate.

10. The communications device of claim 1 wherein said point of lowest potential is a negative power terminal.

11. The communications device of claim 1 wherein said communications device is a cellular telephone.

12. The communications device of claim 1 including an electrically conductive shield can mounted on said circuit board and electrically connected to said point of least potential, wherein a portion of said electrically conductive layer is electrically coupled to said shield can.

13. The communications device of claim 1 wherein said point of lowest potential is electrically connected to multiple locations on said electrically conductive layer.

14. The communications device of claim 1 wherein said circuit board includes a ground plane electrically connected to said point of lowest potential and said electrically conductive layer is electrically connected to said point of lowest potential through said ground plane.

15. The communications device of claim 14 wherein said electrically conductive layer is electrically connected to said ground plane at multiple locations on said ground plane.

16. The communications device of claim 1 wherein:
said circuit board includes an exposed conductive portion which is electrically connected to said point of lowest potential;
said carrier includes a front wall and a side wall extending from said front wall to said circuit board; and
said side wall contacts said conductive portion of said circuit board to electrically connect said electrically conductive layer to said point of lowest potential.

17. The communications device of claim 1 including an electrically conductive finger extending from said carrier to said circuit board to electrically connect said electrically conductive layer to said point of lowest potential.

18. The communications device of claim 1 including an electrically conductive elastomer extending from said carrier to said circuit board to electrically connect said electrically conductive layer to said point of lowest potential.

19. The communications device of claim 2 wherein said component is a speaker.

20. The communications device of claim 2 wherein said component is a microphone.

21. The communications device of claim 2 wherein said component is an LCD.

22. The communications device of claim 1 including:
a display opening formed in said cover member; and
indicia disposed on said carrier and viewable through said display opening.

23. The communications device of claim 1 including a second cover member opposing said first cover member, said first and second cover members forming an outer housing and defining a cavity therebetween, wherein said circuit board and said carrier are disposed in said cavity.

24. The communications device of claim 23 wherein said first cover member is a front cover member.

25. A communications device comprising:
a) a circuit board;
b) an antenna to transmit and receive RF signals, wherein said antenna is electrically connected to said circuit board; and
c) an electrically conductive layer overlying and spaced apart from said circuit board;
d) wherein said electrically conductive layer is selectively patterned to control the distribution of RF currents on said communications device.

26. The communications device of claim 25 including a substrate overlying said circuit board, wherein said electrically conductive layer is secured to said substrate.

27. The communications device of claim 26 wherein said substrate is a cover member forming at least a part of an outer housing.

28. The communications device of claim 26 further including a cover member forming at least a part of an outer housing, wherein said substrate is a carrier disposed between said cover member and said circuit board.

29. The communications device of claim 25 wherein said electrically conductive layer is self-supporting and integrally formed of an electrically conductive material.

30. The communications device of claim 25 wherein said electrically conductive layer has at least one of a slot and a cutout formed therein to selectively control the path of RF currents in said electrically conductive layer.

31. The communications device of claim 30 wherein the path of RF currents in the electrically conductive layer includes a current choke.

32. The communications device of claim 25 wherein:
said circuit board has a point of lowest potential; and
said electrically conductive layer is electrically connected to said point of lowest potential.

33. The communications device of claim 32 including an electrically conductive shield can mounted on said circuit board between the circuit board and the electrically conductive layer and electrically connected to said point of lowest potential, wherein a portion of said electrically conductive layer is electrically coupled to said shield can.

34. The communications device of claim 32 wherein said circuit board includes a ground plane electrically connected to said point of lowest potential and said electrically conductive layer is electrically connected to said point of lowest potential through said ground plane.

35. The communications device of claim 32 wherein:
said circuit board includes an exposed conductive portion which is electrically connected to said point of lowest potential; and
said electrically conductive layer contacts said conductive portion of said circuit board to electrically connect said electrically conductive layer to said point of lowest potential.

36. The communications device of claim 32 wherein said electrically conductive layer is electrically inductively coupled to said point of lowest potential.

37. The communications device of claim 32 wherein said electrically conductive layer is electrically capacitively coupled to said point of lowest potential.

38. The communications device of claim 32 including an electrically conductive parasitic strip spaced apart from and capacitively coupled to said electrically conductive layer.

39. The communications device of claim 32 wherein said electrically conductive layer is patterned and electrically connected to said point of lowest potential of said circuit board to tune RF currents flowing in said communications device to at least one selected frequency band.

40. The communications device of claim 39 wherein said electrically conductive layer includes a resonant metal element tuned to match a selected frequency.

41. The communications device of claim 39 wherein said electrically conductive layer includes a resonant slot formed therein and tuned to match a selected frequency.

42. The communications device of claim 25 including a microphone mounted on said circuit board, and wherein said electrically conductive layer is patterned such that a void in said electrically conductive layer overlies said microphone.

* * * * *